B. F. HOPKINS.
MEANS FOR DISTRIBUTING LIQUIDS.
APPLICATION FILED OCT. 27, 1913.

1,196,691.  Patented Aug. 29, 1916.

WITNESSES:
Clarence M. Smith
J. B. Webster

INVENTOR
Blake F. Hopkins
BY
ATTORNEY

UNITED STATES PATENT OFFICE.

BLAKE F. HOPKINS, OF SAN FRANCISCO, CALIFORNIA, ASSIGNOR, BY DIRECT AND MESNE ASSIGNMENTS, TO ALLIANCE SECURITIES COMPANY, OF SAN FRANCISCO, CALIFORNIA, A CORPORATION OF CALIFORNIA.

MEANS FOR DISTRIBUTING LIQUIDS.

1,196,691.   Specification of Letters Patent.   Patented Aug. 29, 1916.

Application filed October 27, 1913. Serial No. 797,400.

*To all whom it may concern:*

Be it known that I, BLAKE F. HOPKINS, a citizen of the United States, residing in the city and county of San Francisco, State of California, have invented certain new and useful Improvements in Means for Distributing Liquids; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in air controlled means for applying liquids to surfaces and is particularly designed as an air brush for the purpose of spraying paint upon surfaces to be painted, the object of the invention being to provide means wherein the liquid under pressure passes out of the distributing nozzle and at the same time an independent air outlet is provided whereby the amount of air provided at the nozzle can be controlled irrespective of the amount of liquid used. In the devices now commonly used, the only air control had is that which passes out with the material through the distributing nozzle. This causes a great deal of waste of material which can be obviated by the use of my improved structure and by the employment of which more rapid and efficient work can be done than by the use of the devices commonly employed for this purpose.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claims.

On the drawings, similar characters of reference indicate corresponding parts in the several views.

Figure 2:
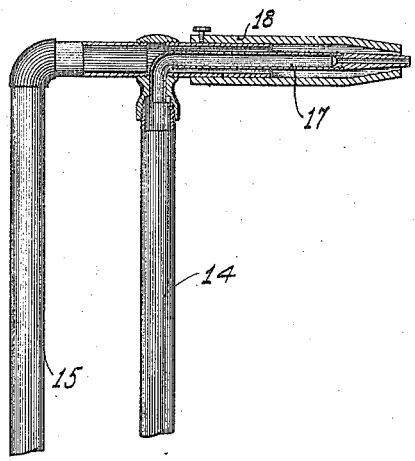
Figure 3:
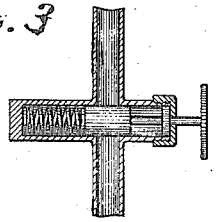
Figure 1:
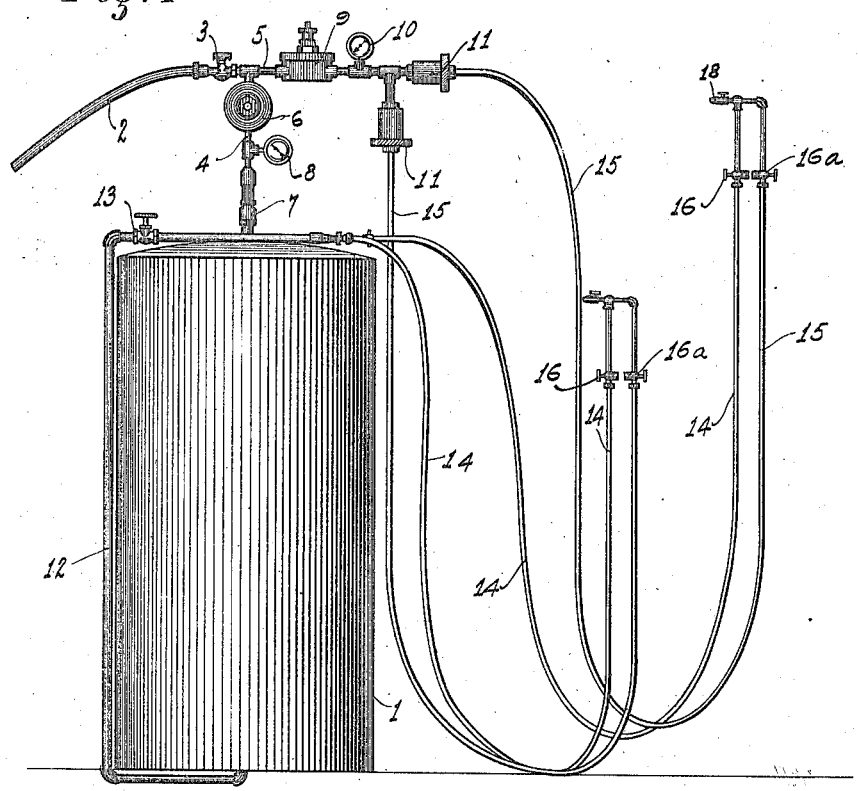

Figure 1 is a side elevation of the complete equipment. Fig. 2 is a detached view in section of the distributing nozzle. Fig. 3 is a sectional view of a plunger valve.

Referring now more particularly to the characters of reference on the drawings, the numeral 1 designates a tank or receptacle for the receipt of the material to be distributed.

The numeral 2 designates a conduit or air line extended from a suitable source of supply, the same having a control valve 3, situated in advance of the branches 4 and 5 extended from the air line 2. The branch 4 leads to the receptacle 1, running into the tank 1 nearly to the bottom thereof its purpose being to agitate the liquid in the tank and is provided with a reducer 6 whereby a desired pressure may be at all times maintained against the material in the tank 1, there of course being a check valve 7 in the pipe 4 to prevent back pressure and a gage 8 for the purpose of observing the pressure passing through the pipe 4.

The branch 5 of the pipe 2 leads to the distributing nozzle, to be presently described, and is provided with a reducing valve 9 for the purpose of maintaining a desired constant pressure in said pipe 5 and is also provided with a gage 10 for an obvious purpose. In the type of machine herein set forth, I show two distributing nozzles and in this respect I wish to point out that with my improved device I may use one, two or more distributing nozzles as may be found desirable. For each of said distributing nozzles, the pipe 5 is provided with an air filter 11 to prevent any deleterious material passing to the nozzle. From the bottom of the receptacle 1 or other suitable place, I connect a pipe 12 having a control valve 13, which pipe is connected with each of the distributing nozzles by means of a hose or other flexible conduit 14. Similarly, from each of the air filters 11, a hose or flexible conduit 15 leads to the discharge nozzle, each of the members 14 and 15 being controlled by a plunger valve 16 and 16$^a$, respectively. The distributing nozzle proper comprises an inner nozzle 17 connected with the member 14 and with an outer nozzle 18 connected with the member 15.

In practice, the material under pressure passes out of the nozzle 17 whenever the valve 16 is open and the air under pressure passes out of the nozzle 18 when the valve 16$^a$ is open and thus the material passing from the nozzle 17 is thoroughly atomized by independent air pressure passing out of the nozzle 18. Heretofore the pressure used in the outer nozzle has always been the same as that passing through the material receptacle and out of the material nozzle 17 and this prevented as accurate and desirable control of the spray of the material as can be had by the use of my improved structure. This advantage, as can be seen, is gained by the branching of the air line 2 and the placing of air reducers on each branch by means of which each independent pressure can be controlled, one for the receptacle and one for the air passing through the nozzle 18.

For the successful carrying out of work of this character, or work in connection with the applying of a liquid coat, such as paint, to surfaces to be covered, it is essential that the pressure for the liquid material and the pressure for the air supply be under the control of the operator in such a manner that variable pressures may be employed, and the pressure of one varied independently of the pressure of the other. In other words, it is required that one pressure may be employed for the container within which the supply of the liquid material is confined, and a different pressure employed relative to the air pipe or conduit leading to the nozzle from which the liquid is to be sprayed. To successfully accomplish this end, it is required that a reducer be employed to control the air pressure leading into the container, and that an independent or separate reducer be incorporated in the air conduit communicating or associated with the air pipe or conduit leading to the spray nozzle. By means of these independent reducers, the operator may admit, for instance, a forty pound pressure to the container for the liquid to be supplied to the spray nozzle, and admit a twenty pound pressure of air passing through the air line or the conduit communicating with the spray nozzle, and these pressures may be varied at will and the variation of pressure of air admitted to the air line may be effected without disturbing the pressure of air admitted to the container for the liquid. Again, the pressure of air to the liquid container may be varied in accordance with the density of the liquid material confined therein, for a greater pressure is required to force a heavy liquid from the container to the spray nozzle than is necessary for the forcing of a lighter liquid to the spray nozzle, although in either case it is not required that the pressure of air passing through the air line to the nozzle be varied at all.

By the described arrangement of the working parts, the regulation of the air pressure is placed under the control of the operator, and, as stated, the change of pressure of air passing through one pipe to the spray nozzle in no manner affects the air pressure in the other. Consequently, a reduction in pressure through the pipe 15, through a regulation of the reducer 9, in no manner varies or changes the pressure admitted into the container through the pipe 12; and equally so, a change in the reducer 6 to vary the air pressure admitted through the pipe 12 into the container 1, does not vary or affect the air pressure passing through the pipe 15 to the spray nozzle 18.

There is thus provided means for moving liquids of different specific gravity or density from the container to the spray nozzle controlled by the operator, and the controlling of which in no manner whatsoever affects or varies the air pressure for forcing the said liquid from within the said spray nozzle onto the surface to which the same is to be applied, and which pressure of the propelled medium for ejecting the liquid from the spray nozzle may be varied to conform to the working conditions for the proper distribution of the liquid to the surface to which it is to be applied, for it will be readily understood that the air pressure is required to be varied in accordance with the surfaces to which the liquid is to be applied. In some instances, it is necessary that a heavy air pressure be employed to force the liquid onto the surface to be coated, while in other cases, a less pressure of air is necessary for this purpose, but in either case it is necessary, for the successful applying of the liquid, that the pressure for forcing the same from the container to the spray nozzle be capable of regulation or variation in accordance with the gravity or density of the said material, and that such variation or change in pressure be performed without affecting the adjusted pressure for the air supply.

From the foregoing description it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention.

Having thus described my invention what I claim as new and useful and desire to secure by Letters Patent is:—

1. An apparatus for the described purpose comprising in combination a closed liquid receptacle, a spray nozzle including separate inner and outer tubular discharge members, a liquid conduit leading from the liquid receptacle to one of the tubular discharge members of the spray nozzle, a main compressed air supply conduit, branch pipes connected therewith and leading respectively to the said receptacle and the other of said tubular discharge members of the spray nozzle, and independent controllable reducing means interposed in each of the branch air supply pipes permitting the variation of the air pressure in either of said branch pipes without affecting the pressure in the other.

2. An apparatus for the described purpose, the same comprising a closed receptacle for the liquid to be applied, an air pressure supply connected with said receptacle, controlled reducing means associated with said supply for regulating the pressure of the air passing therethrough into the receptacle, a spray nozzle, a liquid conduit extended from the said receptacle and connected with the spray nozzle, an air supply conduit connected with the spray nozzle for atomizing the liquid ejected therefrom under pressure, and controllable reducing means associated with said air supply conduit for regulating the pressure of air passing therethrough without varying the air pressure within the liquid receptacle.

3. An apparatus for the described purpose, the same comprising a closed receptacle for the liquid to be applied, an air pressure supply connected with said receptacle, controlled reducing means associated with said supply for regulating the pressure of the air passing therethrough into the receptacle, a spray nozzle, a liquid conduit extended from the said receptacle and connected with the spray nozzle, an air supply conduit connected with the spray nozzle for atomizing the liquid ejected therefrom under pressure, controllable reducing means associated with said air supply conduit for regulating the pressure of air passing therethrough without varying the air pressure within the liquid receptacle, and a valve interposed in the liquid conduit and within the air conduit for varying the flow quantity of the liquid and of the air respectively passing through said conduits to the spray nozzle.

4. An apparatus for the described purpose, the same comprising a spray nozzle comprising an inner and outer member, a conduit for supplying liquid under pressure to the inner member, a conduit for supplying air under pressure to the outer member, means for forcing liquid under pressure through the first mentioned conduit and air under pressure through the last mentioned conduit, an independently operated pressure regulator associated with each of said conduits, whereby the pressure in either conduit may be varied without affecting the pressure in the other conduit.

5. In an apparatus of the class described, a delivery nozzle, means to supply liquid under pressure to said nozzle, and means to vary the pressure under which said liquid is supplied to said nozzle, in combination with means to supply air under pressure to said nozzle, and means to independently vary the pressure under which said air is supplied to the nozzle.

6. In an apparatus of the class described, a delivery nozzle having independent delivery passages therethrough, means to supply liquid under pressure to one of the nozzle passages, and means to vary the pressure under which said liquid is supplied to said nozzle passage, in combination with means to supply air under pressure to another of said nozzle passages, and means to independently vary the presure under which said air is supplied to said last mentioned nozzle passage.

In testimony whereof I affix my signature in presence of two witnesses.

BLAKE F. HOPKINS.

Witnesses:
JOHN DONNELL,
WM. R. TWAMLEY.